United States Patent [19]

Bjorklund et al.

[11] 4,091,290
[45] May 23, 1978

[54] STARK TUNING OF FOUR-WAVE MIXING PROCESSES

[75] Inventors: Gary Carl Bjorklund, West Windsor; Richard Reiling Freeman, Middletown, both of N.J.

[73] Assignee: Bell Telephone Laboratories, Incorporated, Murray Hill, N.J.

[21] Appl. No.: 831,529

[22] Filed: Sep. 8, 1977

[51] Int. Cl.² ............................................. H03F 7/00
[52] U.S. Cl. ................................. 307/88.3; 313/227
[58] Field of Search ........................................ 307/88.3

[56] References Cited
PUBLICATIONS

Abrams et al., "IEEE Journal of Quantum Electronics", QE-13, (1977), pp. 82–85.
Hodgson et al., "Physical Review Letters", 32, (1974), pp. 343–346.

*Primary Examiner*—Rudolph V. Rolinec
*Assistant Examiner*—Darwin R. Hostetter
*Attorney, Agent, or Firm*—Daniel D. Dubosky

[57] ABSTRACT

A source of tunable vacuum ionizing radiation is disclosed in which the range of resonance enhancement is extended by Stark-shifting the frequencies of autoionizing states in the continuum of the conversion medium.

7 Claims, 2 Drawing Figures

STARK TUNING OF FOUR-WAVE MIXING PROCESSES

BACKGROUND OF THE INVENTION

The prior art of generating tunable vacuum ultraviolet radiation by means of a four-photon mixing process (R. T. Hodgson et al, *Physical Review Letters*, 32, 343 (1974)) had known that for a conversion medium such as Strontium vapor, the atoms of which have two electrons in their outermost shells, the output power is increased when the output frequency is near the frequency of an autoionizing state.

Shifting the frequency of an excited state or broadening the resonance by means of the Stark effect had been known in other contexts, such as tuning molecular energy levels (R. L. Abrams et al, *IEEE Journal of Quantum Electronics*, QE-13, 82 (1977)), but one skilled in the art would have assumed that it was not possible to shift autoionizing states by means of the Stark effect.

SUMMARY OF THE INVENTION

The invention relates to an apparatus for generating tunable vacuum ultraviolet radiation in which the range of resonance enhancement of a four-photon mixing process of conventional type is extended by broadening the frequency of an autoionizing state of the conversion medium by means of the Stark effect. The Stark-shifting is accomplished by placing a pair of electrodes in the conversion medium used for the mixing process and applying a high voltage to the electrodes in synchronism with the passage of the beams of input radiation.

Further features of the invention will become evident to those skilled in the art from the following description.

DETAILED DESCRIPTION

Figure 1:
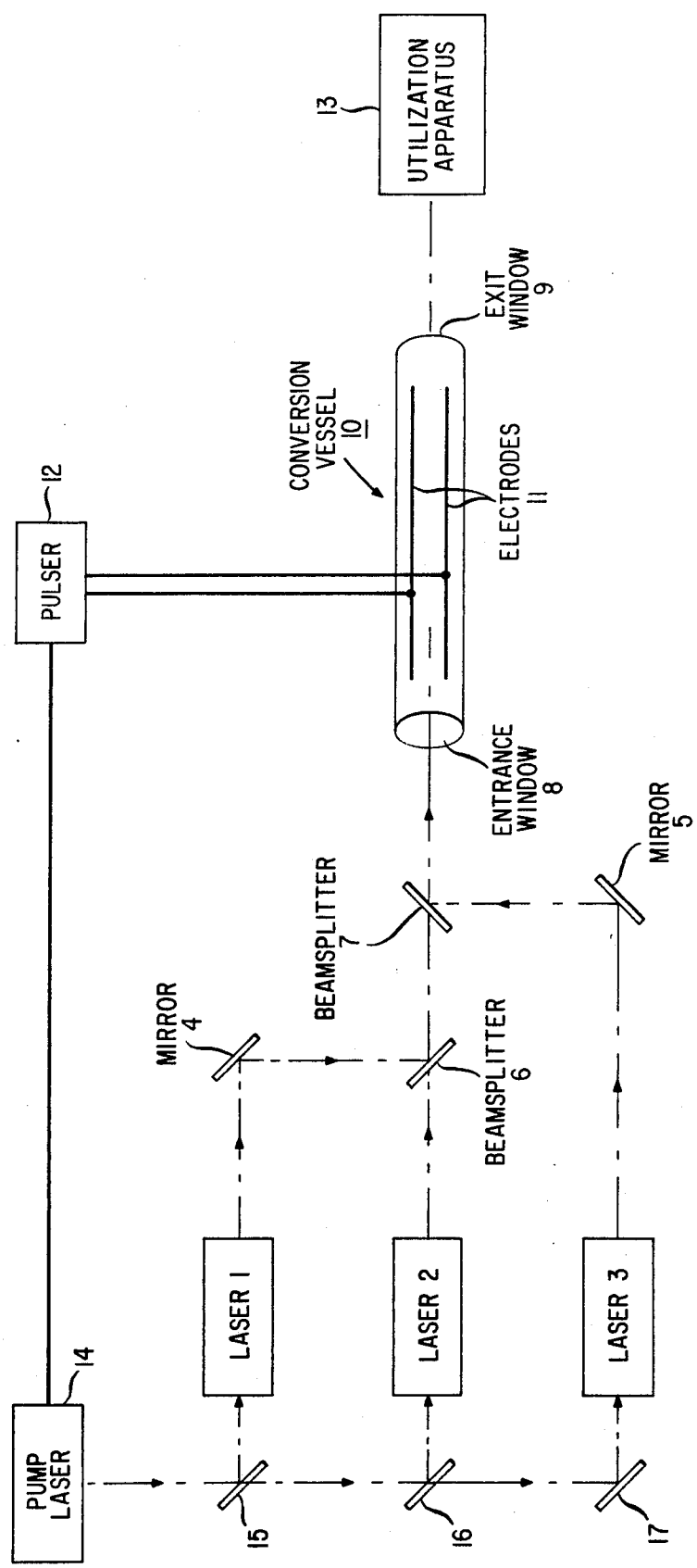
FIG. 1 shows, in partially pictorial, partially schematic form, a radiation generator constructed according to the invention.

In FIG. 1, pump laser 14, illustratively a Nd:YAG laser, optically pumps lasers 1, 2 and 3, by means of beamsplitters 15 and 16 and mirror 17.

Lasers 1, 2 and 3 then generate input beams that are combined by mirrors 4 and 5 and beamsplitters 6 and 7 into a collinear synchronized beam that enters window 8 of conversion vessel 10, passes along the axis of the conversion vessel between electrodes 11 generating ultraviolet radiation at a frequency $$\omega_4 = \omega_1 + \omega_2 + \omega_3, \tag{1}$$

which radiation passes out window 9 to utilization apparatus 13. A voltage pulse is applied to electrodes 11 by pulser 12 in synchronism with the passage of the input beams through the conversion medium. Illustratively, pulser 12 receives a timing signal from pump laser 14, which timing signal is delayed in time so that the voltage pulse applied to electrodes 11 is in synchronism with the input laser pulses. The frequency of a autoionizing resonance of the conversion medium is altered through the Stark effect to a value that provides resonance enchancement at the desired output frequency. The value of the voltage and hence of the electric field between electrodes 11 will be set to a predetermined value to provide optimum output enhancement.

For a conversion medium (illustratively Strontium vapor) the atoms of which have two or more electrons in the outermost shell, the resonance spectrum is more complex than it is for single-electron elements such as the alkalai metals. In particular, two-electron atoms will not only have a spectrum of states in which one electron remains in the ground state while the other electron is excited to various levels, they will also have a series of spectra in which both electrons are excited to various levels. Some of the states of these spectra, called autoionizing states, will be higher in energy than the limit of the first (one electron in the ground state) spectrum. The term autoionizing results from this energy difference, since an atom in an autoionizing state can reduce its energy by dropping one electron back to the ground state and ejecting the other, i.e., by ionizing itself.

Since the autoionizing states are coupled to the continuum, they are different in nature from the discrete states that have been Stark-tuned before, and one skilled in the art would have assumed that it was not possible to use Stark tuning on autoionizing states.

Figure 2:
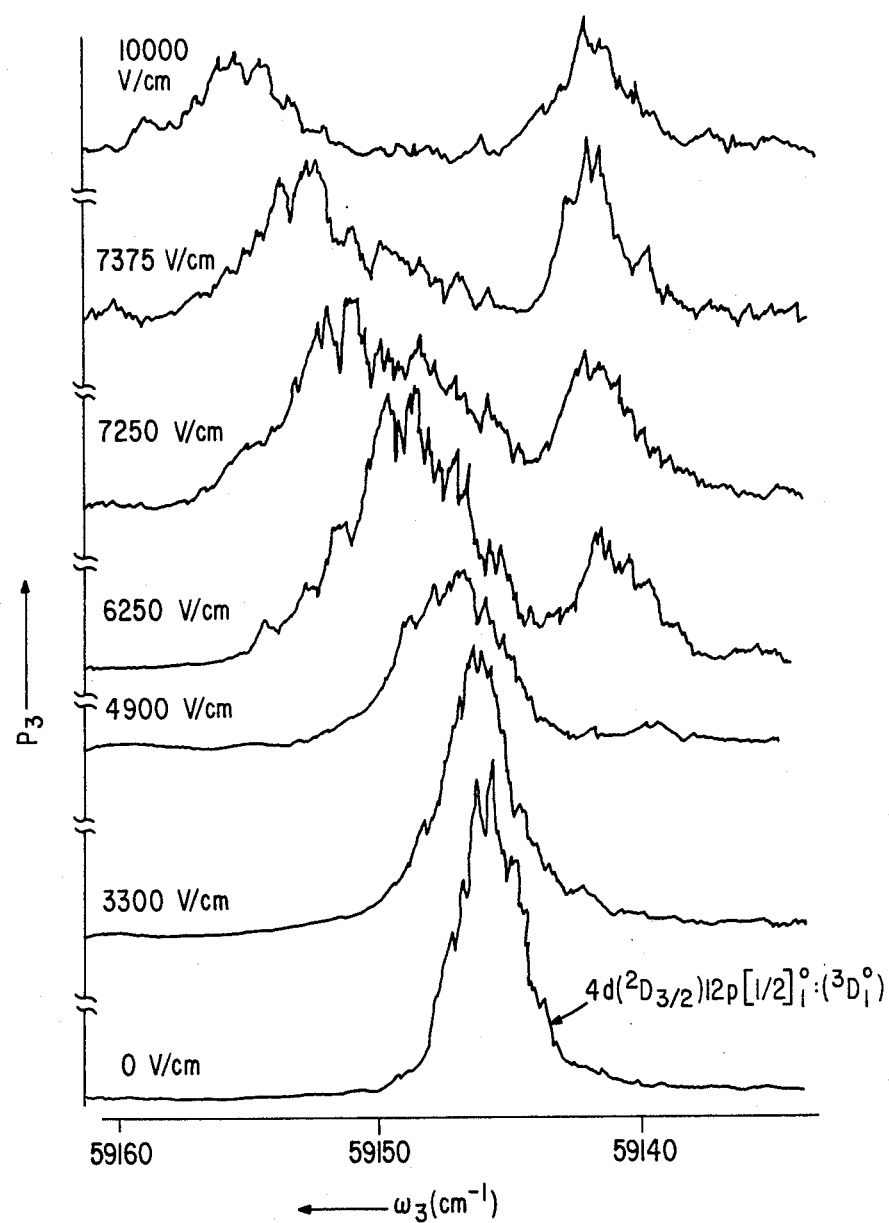
FIG. 2 shows a plot of output power as a function of $\omega_4$, with various values of the Stark-shifting field.

The invention has been reduced to practice in an apparatus similar to that of FIG. 1. Two Hansch-type dye lasers (pumped by the second or third harmonics of a Q-switched Nd:YAG laser) provided 7 nanosecond duration pulses of polarized radiation at the fundamental frequencies. The lasers were adjusted to provide the best possible spatial mode. The various paths of the beams were adjusted for maximum temporal overlap, collinearly combined with parallel polarizations and focused into the conversion cell. The conversion medium used was Strontium vapor, confined in a vapor cell which had a 30 centimeter long hot zone and contained about 25 Torr of He buffer gas to protect the windows. Resonance enchancement of $$\omega_3 = 2\omega_1 + \omega_2 \tag{2}$$

was provided by setting $2\omega_1$ equal to the 38444 cm$^{-1}$ resonance frequency of the $5S^2\ ^1S_o - 5S\ 7S\ ^1S_o$ two photon transition. The frequency $\omega_2$ was then varied to generate different values of $\omega_3$. Plots of the output power at $\omega_3$ as a function of $\omega_3$ are shown in arbitrary units in FIG. 2 for various values of the Stark field. The graphs are separated by arbitrary amounts for clarity of presentation, and no significance should be attached to the vertical position of the several graphs. DC voltages of the magnitude shown in FIG. 2 cause the Strontium vapor to break down, so a pulse lasting less than 20 nanoseconds was applied, timed to reach a predetermined value when the input laser pulses (less than 10 nanoseconds) passed between the electrodes. The laser pulses could be longer than the voltage pulse, of course, the result being a very small output when the Stark enchancment was not present. Comparing the figures at various fields demonstrates that the range resonance enchancement is extended by the use of the Stark field.

The invention could also be practiced in an apparatus using three input lasers, using the reaction $$\omega_4 = \omega_1 + \omega_2 + \omega_3 \tag{3}$$

with $\omega_1 + \omega_2$ equal to the 38444 cm$^{-1}$ resonance frequency and $\omega_3$ being varied.

If the phase-matching of the output frequency is desired, it may be provided by conventional methods, wellknown to those skilled in the art.

What is claimed is:

1. A tunable source of ultraviolet radiation comprising:
   a conversion vessel having an entrance window transparent to visible radiation and an exit window transparent to ultraviolet radiation located along an axis, containing a conversion medium the atoms of which have at least two electrons in the outermost shell, which conversion medium has a spectrum of autoionizing states,
   means for applying an electric field to said conversion medium so that said spectrum of autoionizing states is altered by the Stark effect,
   means for generating at least two synchronized input beams of coherent optical radiation the frequencies of which at least two input beams combine to an output frequency close to the frequency of an autoionizing state of said conversion medium, and
   means for directing into said conversion vessel along said axis said at least two input beams in synchronism with said electric field whereby output ultraviolet radiation is generated in said conversion medium.

2. A source of ultraviolet radiation according to claim 1 in which said means for applying an electric field to said conversion medium comprises a pair of electrodes disposed about said axis.

3. A source of ultraviolet radiation according to claim 2, in which said conversion medium is a gas.

4. A source of ultraviolet radiation according to claim 3, in which said at least two input beams are pulsed and in which said means for applying an electric field to said conversion medium further comprises means for synchronizing the application of said electric field with the passage of said input beams through said conversion medium.

5. A source of ultraviolet radiation according to claim 4 in which said conversion medium is a metallic vapor.

6. A source of ultraviolet radiation according to claim 5 in which said conversion medium is a metallic vapor from Column II of the Periodic Table of the Elements.

7. A source of ultraviolet radiation according to claim 6 in which said conversion medium is Strontium vapor.

* * * * *